US008840945B2

(12) United States Patent
Arnaudov et al.

(10) Patent No.: US 8,840,945 B2
(45) Date of Patent: Sep. 23, 2014

(54) METHOD FOR PREPARING AGGREGATED PROTEIN PARTICLES

(75) Inventors: Luben Nikolaev Arnaudov, Vlaardingen (NL); Theodorus Berend Jan Blijdenstein, Vlaardingen (NL); Andrew Richard Cox, Sharnbrook (GB); Petrus Wilhelmus N de Groot, Vlaardingen (NL); Simeon Dobrev Stoyanov, Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 194 days.

(21) Appl. No.: 13/387,249

(22) PCT Filed: Jul. 19, 2010

(86) PCT No.: PCT/EP2010/060387
§ 371 (c)(1),
(2), (4) Date: Jan. 26, 2012

(87) PCT Pub. No.: WO2011/015443
PCT Pub. Date: Feb. 10, 2011

(65) Prior Publication Data
US 2012/0121776 A1    May 17, 2012

(30) Foreign Application Priority Data
Aug. 4, 2009 (EP) ................................ 09167194

(51) Int. Cl.
| C12H 1/14 | (2006.01) |
| A23P 1/02 | (2006.01) |
| A23L 1/00 | (2006.01) |
| A23L 1/305 | (2006.01) |
| A23G 9/38 | (2006.01) |
| A23J 3/08 | (2006.01) |
| A23J 3/00 | (2006.01) |

(52) U.S. Cl.
CPC .............. *A23L 1/0097* (2013.01); *A23P 1/02* (2013.01); *A23L 1/0017* (2013.01); *A23L 1/305* (2013.01); *A23G 9/38* (2013.01); *A23V 2002/00* (2013.01); *A23J 3/08* (2013.01); *A23J 3/04* (2013.01); *A23L 1/3056* (2013.01)
USPC .............................. 426/329; 426/656; 426/34

(58) Field of Classification Search
USPC .................................................. 426/656, 329
See application file for complete search history.

(56) References Cited

U.S. PATENT DOCUMENTS 3,535,304 A * 10/1970 Buchanan et al. ............ 530/360
4,734,287 A    3/1988 Singer et al.

(Continued)

FOREIGN PATENT DOCUMENTS

EP    0485663 A1    5/1992
EP    1839492 A1    10/2007

(Continued)

OTHER PUBLICATIONS

Schmitt: Whey Protein Soluble Aggregates from Heating with NaCl: Physicochemical, Interfacial, and Foaming Properties: Langmuir 2007, 23, 4155-4166.*

(Continued)

*Primary Examiner* — Patricia George
(74) *Attorney, Agent, or Firm* — Alan A. Bornstein

(57) ABSTRACT

The present invention has as an objective to provide protein particles which have strongly reduced surface activity, and can be used as an ingredient in foams and aerated food products while not interfering with stabilisers at the gas bubble interface. This invention provides a method to produce such aggregated protein particles, as well as the aggregated protein particles which have strongly reduced surface activity.

12 Claims, 4 Drawing Sheets

(56) References Cited

U.S. PATENT DOCUMENTS

| | | | |
|---|---|---|---|
| 4,855,156 | A | 8/1989 | Singer et al. |
| 6,605,311 | B2 * | 8/2003 | Villagran et al. ............ 426/656 |
| 6,767,575 | B1 | 7/2004 | Huss et al. |
| 7,658,962 | B2 | 2/2010 | Hussein et al. |
| 2009/0035437 | A1 | 2/2009 | Bovetto et al. |

FOREIGN PATENT DOCUMENTS

| | | |
|---|---|---|
| EP | 1889544 A1 | 2/2008 |
| WO | WO9117665 | 11/1991 |
| WO | WO9307761 | 4/1993 |
| WO | WO2006058538 A1 | 6/2006 |
| WO | WO2007071405 A1 | 6/2007 |
| WO | WO2007136263 A1 | 11/2007 |
| WO | WO2008046732 A1 | 4/2008 |
| WO | WO2008046742 A1 | 4/2008 |

OTHER PUBLICATIONS

Marinova: Physico-chemical factors controlling the foamability and foam stability of milk proteins: Sodium caseinate and whey protein concentrates; Food Hydrocolloids 23 (2009) 1864-1876; Article history: Received Dec. 30, 2008; Accepted Mar. 12, 2009.*

Rosenberg: Water-Insoluble, Whey Protein-based Microspheres Prepared by an All-aqueous Process; Journal of Food Science-vol. 69, Nr. 1, 2004; Published on Web Jan. 23, 2004.*

1972, Manual of Symbols and Terminology, Pure and Applied Chemistry, vol. 31, No. 4, 579-638.

Dissanayake et al., 2009, Functional properties of whey proteins affected by heat treatment and hydrodynamic high-pressure shearing, Journal of Dairy Science, vol. 92, No. 4, 1387-1397.

Murray, et al, Jan. 1, 2004, Foam stability proteins and nanoparticles, Current Opinion in Colloid & Interface Sc, 9, 314-320.

Nicorescu et al., 2008, Combined effect of dynamic heat treatment and ionic strength on the properties of whey protein foams—Part I, Food Research International, 41, 707-713.

Nicorescu et al., 2008, Combined effect of dynamic heat treatment and ionic strength on the properties of whey protein foams—Part II, Food Research International, 41, 980-988.

Phillips, et al., 1990, pH and Heat Treatment Effects on Foaming of Whey Protein Isolat, Journal of Food Science, vol. 55, No. 4, 1116-1119.

Weijers et al., 2004, Influence of the Ionic Strength on the Structure of Heat-Set Globular Protein Gels at pH 7. Ovalbumin, Marcomolecules, 37, 8709-8714.

Weijers et al., 2006, Structure and rheological properties of acid-induced egg white protein gels, Food Hydrocolloids, 20, 146-159.

European Search Report, Application No. EP 09 16 7194, dated Jan. 27, 2010.

International Search Report, International Application No. PCT/EP2010/060387, mailed Sep. 3, 2010.

Written Opinion International Application No. PCT/EP2010/060387.

Co-Pending application Arnaudov, U.S. Appl. No. 13/387,255, filed Jan. 26, 2012.

Opinion of the Scientific Panel on Food Additives, Flavourings, Processing Aids and Materials in Contact with Food (AFC) on a request from the Commission related to Ethyl Cellulose as a food additive, The EFSA Journal, Feb. 17, 2004, pp. 1-6, 35.

Blijdenstein, Aerated Food product and Process for Preparing It, WIPO Description WO20080646699, Apr. 24, 2008, . . . .

Blijdenstein, Aerated Food Product and Process for preparing It, WIPO Description WO20080646699—Abstract, Apr. 24, 2008, . . . .

Marinova et al, Physico-chemical factors controlling the foamability and foam stability of milk proteins: Sodium caseinate and whey protein concentrates, Food Hydrocolloids, 2009, pp. 1864-1876, 23.

Palmer et al., The Influence of Hydrophilic Pore Formers on Dipyridamole Relseas from Aqueous Ethylcellulose Film-Coated pellets, Colorcon, Nov. 2007, 5 pages,.

Schmitt et al., Whey Protein Soluble Aggregates from heating with NaCl : Physiochemical, Interfacial, and Foaming Properties, Langmuir, 2007, PP4155-4166, 23.

* cited by examiner

METHOD FOR PREPARING AGGREGATED PROTEIN PARTICLES

The present invention relates to a method for preparation of aggregated protein particles. The invention further relates to the aggregated protein particles, and to the use of these particles in aerated food products.

BACKGROUND OF THE INVENTION

Dairy proteins like the caseins and whey proteins are among the most widely used food ingredients. Also other proteins like soy protein and chicken egg protein are commonly used food ingredients. A property of many of these proteins is that they are surface active, some more than other, which means that many of these proteins can act as emulsifiers or foam stabilisers in food products. In many cases however it is undesirable that the proteins are surface active, as it may lead to foaming or emulsification problems in manufacturing processes. Nevertheless due to its nutritional properties and for example texturising properties, food formulators still want to include the proteins in their food products. Hence there is a desire to use proteins which have strongly reduced surface activity.

It is well known that dairy whey protein can be formed into particles, by heating whey protein under shear. For example, WO 91/17665 disclose a process for the formation of microparticulated denatured proteins, wherein the microparticulates are water-dispersible. WO 93/07761 discloses spray dried microparticulated protein product characterized as an agglomerate of rehydratable proteinaceous microparticles surrounded by a soluble matrix. WO 2006/058538 discloses a method for preparation of denatured whey protein microparticulates. U.S. Pat. No. 4,734,287 discloses a macrocolloid containing non-aggregated particles of whey protein.

It is also known that heat treatment reduces the ability of whey protein to act as foam stabiliser. Phillips et al. (Journal of Food Science, 1990, vol. 55, p. 1116-1119) disclose that the heat treatment of whey protein solutions reduces the foaming ability of these solutions. Dissanayake et al. (Journal of Dairy Science, 2009, vol. 92, p. 1387-1397) disclose a method to produce whey protein particles, which do not show foaming ability. The process involves a heating step at 90° C. for 20 minutes, subsequently a high pressure microfluidisation step at 140 MPa is performed, and this is followed by spray drying the obtained material.

Nicorescu et al. (Food Research International, 2008, vol. 41, p. 707-713) disclose that heating of solutions of whey protein influences the surface tension of these solutions: heating leads to a surface tension of about 40 to 50 mN·m$^{-1}$, which means that the proteins are less surface active as compared to non-heated proteins. The thermodynamic affinity of protein aggregates towards air interfaces is weaker, however the proteins as disclosed are still surface active.

In a continuation of this work, Nicorescu et al. (Food Research International, 2008, vol. 41, p. 980-988) disclose that insoluble aggregates of whey protein apparently have the role of foam depressors.

EP 1 839 492 A1 discloses a method to prepare whey protein micelles by heating an aqueous whey protein solution at a pH between 3 and 8 to a temperature between 80 and 98° C., in the absence of shearing, followed by a concentration step. The last step is required to remove non-micellised material, or simply for concentration. The obtained micelles have a very small average particle size, and this material can be used as an emulsifier or as a foam stabiliser. This means that the micelles are still surface active.

EP 485 663 A1 discloses a method wherein whey protein is partly denatured, and subsequently at least part of the undenatured protein still present is removed. This material can act as emulsifier.

WO 2007/136263 A1 discloses a method to produce protein particles, and use these particles as encapsulation material, wherein the particles are produced by heating a protein. No separation step occurs wherein surface active material is separated from non-surface active material, hence the particles obtained will still be surface active.

U.S. Pat. No. 6,767,575 B1 discloses an icecream containing protein aggregates. The aggregates are prepared by heating whey protein such that at most 90 to 95% of the whey is denatured. This means that the whey protein particles will still be surface active.

WO 2007/071405 A1 discloses hydrophobic denatured protein particles, which still are surface active, as they may be located at the oil-water interface of an emulsion.

EP 1 889 544 A1 discloses interfacially active particles which may be made out of protein aggregates.

U.S. Pat. No. 4,855,156 discloses a frozen whipped dessert comprising non-aggregated particles of denatured protein. These particles are still surface active.

A common disadvantage of all protein particles and aggregates as cited, is that they are still surface active. Hence when preparing an aerated or foamed composition containing proteins, e.g. an aerated or foamed food product containing proteins, these protein particles will be present at the gas bubble interface. The surface activity of such particles may be relatively low, however as proteins are generally present at relatively high concentrations in compositions like food products, the number of particles at the gas bubble surface will be relatively high. Hence such particles may interfere with stabilisers present at the gas bubble interface, and compete for space with such stabilisers at that interface. As the number of protein particles is generally high, the protein particles will win such competition, and as they are not very strong gas bubble stabilisers, this will lead to instability of the gas bubbles and collapse of the aerated structure of the composition.

SUMMARY OF THE INVENTION

In spite of the efforts made, there still is a need for a simple process for the preparation of proteins which have a strongly reduced surface activity. Such a simple process preferably does not require expensive devices like high pressure equipment. Moreover it is also an object to provide protein material which has a strongly reduced surface activity. Another object of the present invention is to provide protein material that does not suppress the aeration and stability of aerated food product, when the food products contains other foam stabilisers present at the surface of gas bubbles. Thus this protein material preferably does not interfere with emulsifiers or foam stabilisers which are present in the food product, while still providing texture and/or nutritional value to the food product. It is another object to provide food products containing such proteins. Another object of the present invention is to provide aerated food products, which are stable during a prolonged period of time, and that contain surface active materials to stabilise gas bubbles, and protein material which does not destabilise the air bubbles and therewith the texture of the aerated food product should be retained during storage.

We have now determined that one or more of these objects can be achieved by a method wherein a protein in an aqueous solution or dispersion is aggregated into particles, and followed by separating the aggregated protein particles from non-aggregated protein. This has the result that the obtained aggregated protein particles do not have surface active properties anymore. An aqueous dispersion of such aggregated protein particles at a concentration of 1% by weight at 25° C. has a surface tension of at least 60 mN·$^{-1}$, preferably at least 70 mN·m$^{-1}$. Moreover as an advantage no expensive process steps are required to produce this aggregated protein. The advantage of these aggregated protein particles is that they provide the nutritional value and texture usually connected to these proteins, without disturbing the stability of the aerated food composition, as these aggregated protein particles do not interfere with the surface active material present on the gas bubble interface. So these particles can be used in foams and aerated products, while keeping the structure of the aerated food product intact during storage.

Hence in a first aspect the present invention provides a method for preparation of aggregated protein particles, comprising the steps:
a) dissolving or dispersing a protein in an aqueous solution at a concentration between 4% and 15% by weight;
b) aggregating the proteins into particles having a volume weighted mean diameter 20 between 200 nanometer and 20 micrometer;
c) separating aggregated protein particles from non-aggregated protein, and wherein an aqueous dispersion of aggregated protein particles at a concentration of 1% by weight at 25° C. has a surface tension of at least 60 mN·m$^{-1}$, preferably at least 70 mN·m$^{-1}$.

In a second aspect the present invention provides an aggregated protein particle having a volume weighted mean diameter between 200 nanometer and 20 micrometer, and wherein an aqueous dispersion of aggregated protein particles at a concentration of 1% by weight at 25° C. has a surface tension of at least 60 mN·m$^{-1}$, preferably at least 70 mN·m$^{-1}$.

In a third aspect the present invention provides the use of an aggregated protein particle according to the first aspect of the invention in an aerated food product.

DETAILED DESCRIPTION

Unless defined otherwise, all technical and scientific terms used herein have the same meaning as commonly understood by one of ordinary skill in the art.

All percentages, unless otherwise stated, refer to the percentage by weight, with the exception of percentages cited in relation to the overrun.

In the context of the present invention, the average particle diameter is expressed as the $d_{4,3}$ value, which is the volume weighted mean diameter, unless stated otherwise. The volume based particle size equals the diameter of the sphere that has same the same volume as a given particle.

The term 'aerated' means that gas has been intentionally incorporated into a composition, for example by mechanical means. The gas can be any gas, but is preferably, in the context of food products, a food-grade gas such as air, nitrogen, nitrous oxide, or carbon dioxide. The extent of aeration is measured in terms of 'overrun', which is defined as:

$$\text{overrun} = \frac{\text{weight of unaerated mix} - \text{weight of aerated product}}{\text{weight of aerated product}} \times 100\%$$

where the weights refer to a fixed volume of aerated product and unaerated mix (from which the product is made). Overrun is measured at atmospheric pressure.

After formation, a foam will be vulnerable to coarsening by mechanisms such as creaming, Ostwald ripening and coalescence. By creaming, gas bubbles migrate under the influence of gravity to accumulate at the top of a product. Ostwald ripening or disproportionation refers to the growth of larger bubbles at the expense of smaller ones. Coalescence refers to merging of air bubbles by rupture of the film in between them.

A stable foam or aerated food product in the context of the present invention is defined as being stable for at least 30 minutes, more preferred at least an hour, more preferred at least a day, even more preferred at least a week, and most preferred at least a month, and most preferred several months. With stable is meant that the foam is stable, which means that gas bubbles in the foam do not coalescence to become larger gas bubbles, or only show very limited coalescence. A stable foam can be defined to be stable with regard to total foam volume, and/or gas bubble size, and loses maximally 20% of its volume during 1 month storage. On the other hand systems may exist which loose more than 20% of its volume during 1 month storage, which nevertheless are considered to have a good stability, as the stability of such foams is much better than comparative foams. Stability can be described as that the foam and gas bubbles are stable against Ostwald ripening, which leads on the one hand to relatively small bubbles decreasing in size and relatively large bubbles increasing in size. This is caused by diffusion of gas from small to large bubbles, due to a higher effective Laplace pressure in the small bubbles as compared to the larger bubbles. In foams as described by the present invention, Ostwald ripening can be considered to be most important mechanism responsible for instability of the gas bubbles. An alternative mechanism for instability is coalescence, wherein two or more gas bubbles merge due to the breakage of the liquid interface between the bubbles and form one larger bubble with a larger volume.

Such a foam can be produced by aerating the solution of interest using an aerolatte, kenwood mixer, or a BA Mixer, to an overrun of 100%. The foam is then placed into a 100 mL measuring cylinder, stoppered, and stored at 5° C., and the foam volume measured over time.

Reduced surface activity of the protein material has to be understood as that an aqueous dispersion of aggregated protein particles at a concentration of 1% by weight at 25° C. has a surface tension of at least 60 mN·m$^{-1}$, preferably at least 65 mN·m$^{-1}$, more preferably at least 70 mN·m$^{-1}$ and even more preferably more than 71 mN·m$^{-1}$, or even more than 71.5 mN·m$^{-1}$. The maximum surface tension is 71.97 mN·m$^{-1}$, which is the surface tension of water. If the surface tension of an aqueous dispersion of aggregated protein particles is determined as function of time, then the surface tension preferably is at least 60 mN·m$^{-1}$, preferably at least 65 mN·m$^{-1}$, more preferably at least 70 mN·m$^{-1}$ and even more preferably more than 71 mN·m$^{-1}$, or even more than 71.5 mN·m$^{-1}$ during at least 60 seconds. This means that when the aggregated protein particles according to the invention are used in the presence of one or more surface active components, it does not significantly interfere with the foam stabilisation capacity of such surface active components.

In the context of the present invention, a 'surface active agent' (=surfactant) is a substance which lowers the surface tension of the medium in which it is dissolved, and/or the interfacial tension with other phases, and, accordingly, is positively adsorbed at the liquid/vapour and/or at other interfaces. Surface active agents include proteins, detergents, and soaps, syndets, emulsifiers, and foaming agents. (Pure Appl. Chem., Vol. 31, No. 4, pp. 579-638, 1972)

For the purposes of this invention, surface active agents of interest are those that positively adsorb to the air/water surface. Examples of surface active agents include, but are not limited to: sodium dodecyl sulphate (SDS), cetyl trimethyl ammonium bromide (CTAB), milk proteins, lecithin.

In a first aspect the present invention provides a method for preparation of aggregated protein particles, comprising the steps:
a) dissolving or dispersing a protein in an aqueous solution at a concentration between 4% and 15% by weight;
b) aggregating the proteins into particles having a volume weighted mean diameter between 200 nanometer and 20 micrometer;
c) separating aggregated protein particles from non-aggregated protein, and wherein an aqueous dispersion of aggregated protein particles at a concentration of 1% by weight at 25° C. has a surface tension of at least 60 mN·m$^{-1}$. Preferably the surface tension is at least 65 mN·m$^{-1}$, more preferably at least 70 mN·m$^{-1}$ and even more preferably more than 71 mN·m$^{-1}$, or even more than 71.5 mN·m$^{-1}$.

The protein material used in the method according to the invention can be any protein material which may be aggregated, such that the aggregates can be separated from non-aggregated proteins and the resulting aggregates have reduced surface activity. Aggregation of proteins in the context of the present invention is understood to be an irreversible process, meaning that the aggregates do not fall apart into single molecules upon change of conditions like pH, temperature, and the like.

Preferably the protein material comprises dairy whey protein. Whey protein is well known, and mainly comprises beta-lactoglobulin (about 65% by weight), alpha-lactalbumin (about 25% by weight), and serum albumine (about 8% by weight).

Another preferred protein material is chicken egg white protein. The major protein present in chicken egg white protein is ovalbumin (about 54% by weight), which is a globular protein that aggregates upon application of heat (Weijers et al., Macromolecules, 2004, vol. 37, p. 8709-8714; Weijers et al., Food Hydrocolloids, 2006, vol. 20, p. 146-159). Other proteins present in chicken egg white are ovotransferrin (about 12-13% by weight), ovomucoid (about 11% by weight), ovomucin (about 1.5-3.5% by weight), and lysozyme (about 3.5% by weight).

Hence, preferably, the protein material used in the present invention is selected from the group consisting of dairy whey protein and chicken egg white protein.

The preferred whey protein may be any whey protein, such as native whey protein, or whey protein isolate, or whey protein concentrate. A preferred source of the whey protein is WPC 80, which is a whey protein concentrate containing about 80% protein. WPC 80 is manufactured from sweet dairy whey and spray dried. The product is a homogeneous, free flowing, semi-hygroscopic powder with a bland flavor. WPC 80 is commercially available from for example Davisco Foods (Le Sueur, Minn., USA) or DMV International (Veghel, Netherlands).

In the first step of the method according to the invention, the protein is dissolved or dispersed in an aqueous solution at a concentration between 4% and 15% by weight. Preferably the protein concentration in step a) is between 5% and 13% by weight, more preferably between 6% and 12% by weight, most preferably between 8% and 12% by weight.

The pH in step a) at which the protein is dissolved is the natural pH which results from the dissolution or dispersion of the protein. The pH is not critical in this step, as long as it is above the iso-electric point of the (major amount of the) protein(s) used in the invention.

In step b) aggregates are formed from the proteins. This can be caused by denaturation of the proteins, due to which the conformation of the proteins changes, and the protein molecules will arrange into aggregates or conglomerates. Aggregates are structures in which the proteins are joined and that can be separated from non-aggregated proteins. The aggregates are generally insoluble in water. The aggregation facilitates the separation of the dissolved proteins and insoluble proteins. The particle size of the agglomerates that are formed in step b) is such that the volume weighted mean diameter is between 200 nanometer and 20 micrometer. The size of these agglomerates can be determined by any suitable method which is known to the skilled person. Preferably the volume weighted mean diameter is at least 300 nanometer, more preferred at least 350 nanometer, more preferred at least 400 nanometer, more preferred at least 450 nanometer, most preferred at least 500 nanometer. Preferably the volume weighted mean diameter is not more than 15 micrometer, more preferred not more than 10 micrometer, more preferred not more than 6 micrometer, more preferred not more than 4 micrometer, most preferred not more than 3 micrometer. The aggregated particle volume averaged mean diameter is most preferably at least 1 micrometer, more preferred at least 1.3 micrometer, most preferred at least 1.5 or at least 2 micrometer. A preferred range for the volume weighted mean diameter in step b) is between 500 nanometer and 15 micrometer, preferably between 1 micrometer and 4 micrometer. At this diameter range good results were obtained. Preferred ranges combining the preferred endpoints mentioned in this paragraph are within the scope of this invention.

In a further process step, the obtained particles may be decreased in size before being used further, for example by any method known in the art such as ultrasound. The decrease of the size of the aggregates may be done to an average diameter of the obtained material of about 200, or 300, 400, or even 500 nanometer or larger than this, depending on the initial size of the agglomerates before size reduction.

Preferably in step b) at least 50% by weight of the protein present in step a) is aggregated More preferably at least 60% by weight, more preferably at least 70% by weight, more preferably at least 80% by weight, even more preferably at least 90% by weight of the protein present in step a) is aggregated in step b). This can be determined by methods known to the skilled person. During the aggregation in step b), the aggregation takes place gradually over time, during which time the amount of protein material that is aggregated grows to a maximum, and when this maximum has been reached, the aggregation remains at this maximum. This means that a plateau is reached at the maximum aggregation.

A preferred method according to the invention is that the aggregation step b) is performed by heating of the protein solution under shear at a temperature between 75 and 99° C., during a period of between 10 and 300 minutes. We believe that due to the heating step, the proteins denaturate, leading to a change of the conformation of the proteins. For globular proteins like beta-lactoglobulin and ovalbumin this generally leads to aggregation of these proteins.

The denaturation temperatures of some of the preferred proteins which are aggregated by heat are as follows (Fox, 1989, Developments in dairy chemistry, part 4, Elsevier, London and New York; Weijers et al., Food Hydrocolloids, 2006, vol. 20, p. 146-159):
beta-lactoglobulin: 67-72° C. at pH 6.5
alpha-lactalbumin: 62° C. at pH 6.5
serum albumine: 85° C. at pH 6.5
ovalbumin: 75-84° C.
ovotransferrin: 61-65° C.

ovomucoid: 77° C.
lysozyme: 69-77° C.

If heating is used as a method to aggregate the protein, the heating temperature preferably is higher than the denaturation temperature of the protein which is used in the method according to the invention. For example in case of the use of whey proteins in the method according to the invention, the heating temperature is preferably higher than the denaturation temperatures of beta-lactoglobulin and alpha-lactalbumin, thus higher than 72° C. At those preferred denaturation temperatures the precipitation of the major proteins is quicker than at lower temperatures. In case of the use of egg white proteins in the method according to the invention, the heating temperature preferably is above 80° C., because at that temperature the major part of the proteins present will denature and aggregate.

If heating is used as a method to aggregate the protein, preferably the temperature is at least 80° C., more preferred at least 82° C., more preferred at least 83° C. Preferably the temperature is maximally 95° C., more preferred maximally 90° C., most preferred maximally 85° C. A preferred range for the temperature is between 80 and 85° C., more preferred between 80 and 83° C., or alternatively between 83° C. and 85° C. Preferred ranges combining these above mentioned preferred endpoints are within the scope of this invention.

The heating time of the protein solution is more preferably between 20 and 300 minutes, more preferably between 30 and 300 minutes, preferably between 40 and 300 minutes, more preferred between 50 and 300 minutes. More preferred the heating time is maximally 240 minutes, more preferred maximally 180 minutes. Preferred ranges combining these above mentioned preferred endpoints are within the scope of this invention.

During this heating period, the amount of protein present that aggregates gradually grows to a maximum, as indicated before.

If heating is applied in step b) to aggregate the protein into particles, the protein concentration, the heating time, and the heating temperature are dependent on each other. If the temperature is relatively high, then the heating time can be relatively short, and the plateau at which the maximum aggregation has been reached, is reached relatively quickly. Additionally, a higher protein concentration leads to a shorter heating time, due to relatively rapid reaching of the earlier mentioned plateau.

If heating is applied in step b), the process is carried out under shear. The amount of shear applied to the process is such that the proteins will not form a gel upon the heating process. The shear can be applied for example by mixing with a stirrer during the heating of the protein solution.

In step c) the agglomerated protein is separated from the non-agglomerated protein, such that an aqueous dispersion of aggregated protein particles at a concentration of 1% by weight at 25° C. has a surface tension of at least 60 mN·m$^{-1}$, preferably at least 65 mN·m$^{-1}$, more preferably at least 70 mN·m$^{-1}$ and even more preferably more than 71 mN·m$^{-1}$, or even more than 71.5 mN·m$^{-1}$. This step may be performed by filtering, by using a filter having a pore size which retains the agglomerated protein particles, while the non-agglomerated proteins can freely flow through the filter. Another method to separate the agglomerated protein particles from the non-agglomerated protein particles is by centrifuging the solution obtained in step b), in order to concentrate the obtained agglomerates, followed by removing the supernatant. Subsequently the obtained residue after centrifuging can be washed and concentrated again by centrifuging, in order to wash away the non-agglomerated proteins. During this washing step the volume of water added to the residue is preferably at least the same as the volume of the residue. More preferred the volume of water added is at least twice the volume of the residue, preferably at least triple the volume of the residue. During the washing step the residue is resuspended in the water and washed with the added water. The non-agglomerated protein is washed away with the water. Therewith a material is obtained which nearly completely only comprises aggregated protein particles that have reduced surface activity. Hence preferably the separation in step c) is performed by washing with water. The number of washing steps is preferably at least 3, more preferred at least 5, and most preferred at least 10. Another preferred method for step c) is that the separation is performed by a method which includes filtration.

A preferred method according to the invention to produce agglomerated whey protein particles is the following:
a) dissolve 5 to 15% by weight whey powder concentrate (for example WPC 80 ex DMV International) in water;
b) introduce the protein solution into a jacketed double walled glass vessel kept at a temperature between 75° C. and 85° C., typically slightly above 80° C., and set to stir at about 700 rpm on a magnetic stirrer for 45 minutes to 300 minutes;
c) quench cool the solution in cold water;
d) dilute the heated solution at least 3 fold with pure water and divide over centrifuge tubes and centrifuge for 30 minutes at 10,000 to 15,000 g;
e) remove the supernatant and replace with water;
f) repeat steps d and e at least 5 times.

Alternatively the steps d), e), and f) could be performed by filtration.

A preferred method according to the invention to produce agglomerated chicken egg white protein particles is the following:
a) introduce liquid egg white protein (for example Ovod'or, ex Van Tol Convenience Food, 's-Hertogenbosch, The Netherlands) into a jacketed double walled glass vessel kept at a temperature slightly above 80° C. and set to stir at about 700 rpm on a magnetic stirrer for about 100 minutes;
b) quench cool the solution in cold water;
c) dilute the heated solution at least 3 fold with pure water and divide over centrifuge tubes and centrifuge for 30 min at 10,000 to 15,000 g;
d) remove the supernatant and replace with water;
e) repeat steps c and d at least 5 times;

Alternatively the steps c), d), and e) could be performed by filtration.

Preferably, in a further subsequent process step, the aggregated protein particles are dried. The optional drying may be performed by any method which is common in the art. For example, freeze drying on a small scale, or spray drying on a larger scale. A preferred drying method is especially spray drying. If the aggregated protein particles are dried, preferably they are mixed prior to drying with one or more sugars, and especially maltodextrin is a preferred sugar. This has the advantage that the obtained powders are easier do disperse after drying, if they contain maltodextrin in addition to the protein. If maltodextrin is used, then the weight ratio between maltodextrin and protein in the particles is preferably between 5:1 and 1:5, more preferably between 2:1 and 1:2.

In a most preferred embodiment, the invention provides in a first aspect a method for preparation of aggregated protein particles, comprising the steps:
a) dissolving or dispersing a protein in an aqueous solution at a concentration between 4% and 15% by weight, wherein the protein is selected from the group consisting of dairy whey protein and chicken egg white protein;

b) aggregating the proteins into particles having a volume weighted mean diameter between 200 nanometer and 20 micrometer, preferably between 500 nanometer and 15 micrometer, more preferred between 1 micrometer and 4 micrometer; and wherein the aggregating is performed by heating of the protein solution under shear at a temperature between 75 and 99° C., preferably between 80° C. and 85° C., during a period of between 10 and 300 minutes, preferably between 40 and 300 minutes;

c) separating aggregated protein particles from non-aggregated protein, and wherein the separation is performed by washing with water, wherein the number of washing steps is preferably at least 3, more preferred at least 5, and most preferred at least 10.

In a second aspect the present invention provides an aggregated protein particle having a volume weighted mean diameter between 200 nanometer and 20 micrometer, and wherein an aqueous dispersion of aggregated protein particles at a concentration of 1% by weight at 25° C. has a surface tension of at least 60 mN·m$^{-1}$. Preferably the surface tension is at least 65 mN·m$^{-1}$, more preferably at least 70 mN·m$^{-1}$ and even more preferably more than 71 mN·m$^{-1}$, or even more than 71.5 mN·m$^{-1}$. The second aspect of the invention also provides an aggregated protein particle obtainable by the method according to the first aspect of the invention, wherein these particles have a volume weighted mean diameter between 200 nanometer and 20 micrometer, and wherein an aqueous dispersion of aggregated protein particles at a concentration of 1% by weight at 25° C. has a surface tension of at least 60 mN·m$^{-1}$. Preferably the surface tension is at least 65 mN·m$^{-1}$, more preferably at least 70 mN·m$^{-1}$ and even more preferably more than 5 71 mN·m$^{-1}$, or even more than 71.5 mN·m$^{-1}$. The average size of these agglomerates can be determined by any suitable method which is known to the skilled person. Preferably the volume weighted mean diameter is at least 300 nanometer, more preferred at least 350 nanometer, more preferred at least 400 nanometer, more preferred at least 450 nanometer, most preferred at least 500 nanometer. Preferably the volume weighted mean diameter is not more than 15 micrometer, more preferred not more than 10 micrometer, more preferred not more than 6 micrometer, more preferred not more than 4 micrometer, most preferred not more than 3 micrometer. The aggregated particle volume averaged mean diameter is most preferably at least 1 micrometer, more preferred at least 1.3 micrometer, most preferred at least 1.5 or at least 2 micrometer. A preferred range for the volume weighted mean diameter in step b) is between 500 nanometer and 15 micrometer, and even more preferred between 1 micrometer and 4 micrometer. Preferred ranges combining the preferred endpoints mentioned in this paragraph are within the scope of this invention.

The aggregated protein particles according to the present invention can be used in aqueous foam compositions and in aerated food products. Hence preferably the second aspect of the invention provides an aqueous foam composition comprising a surface active material and an aggregated protein particle according to the invention. Such an aqueous foam composition suitably has an overrun of at least 1%, preferably between 1% and 1000%, more preferably between 5% and 800%, more preferably between 10% and 600%, even more preferably between 15% and 500%.

Such an aqueous foam composition preferably is made by aerating an aqueous composition comprising a surface active material. The aggregated protein particles according to the first aspect of the invention can be added to the foam composition prior to aeration (thus as part of an aqeuous premix) or can be mixed into the foam composition after aeration.

The surface active material in the foam may be any surface active compound commonly used in foams, like for example a surfactant, or an emulsifier. The surface active material may also be a protein. Preferably the surface active material comprises water-insoluble solid particles, wherein the particles have a volume weighted mean diameter between 30 nanometer and 10 micrometer. These particles serve to stabilise the air bubbles in the foam, by being present on the interface of the gas bubbles and the water.

In a preferred embodiment these solid particles have a volume weighted mean diameter between 30 nanometer and 2 micrometer, more preferred 30 and 1000 nanometer, even more preferred between 30 and 500 nanometer, or between 30 and 300 nanometer. Other preferred ranges are between 50 and 500 nanometer, and even more preferred between 70 and 300 nanometer. Alternatively, in another preferred embodiment the solid particles have a volume weighted mean diameter between 50 and 200 nanometer. Mostly preferred the volume weighted mean diameter of the solid particles is between 100 and 200 nanometer, or even between 100 and 150 nanometer.

The solid particles are water-insoluble, and the concentration of these particles in the dispersion is preferably between 0.1 and 20% by weight based on the water level of the foam composition, more preferred between 0.5 and 10% by weight, most preferred between 0.5 and 5% by weight. Preferably the water-level of the foam composition created is at least 10% by weight of the foam composition. The term water-insoluble solid particles is understood to have its common meaning, such that the particles do not dissolve in water, or wherein at most 0.1 wt % of a compound dissolves in water when the compound is mixed with water at room temperature, atmospheric pressure and neutral pH.

Preferably the solid particles comprise ethylcellulose. A preferred stabiliser for foams made according to the first aspect of the present invention is ethylcellulose. The general structural formula of ethylcellulose is:

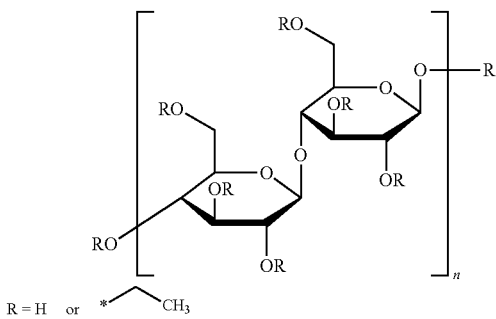

The degree of substitution of the ethylcellulose preferably used in the present invention is preferably between 2 and 3, more preferably about 2.5. The average number of hydroxyl groups substituted per anhydroglucose unit (the 'monomer') is known as the 'degree of substitution' (DS). If all three hydroxyls are replaced, the maximum theoretical DS of 3 results.

Suitable sources and types of the ethylcellulose preferably used in the present invention are supplied by for example Hercules, Aldrich, and Dow Chemicals. Suitable ethylcellulose preferably has a viscosity between 5 and 300 cP at a concentration of 5% in toluene/ethanol 80:20, more preferably between 100 and 300 cP at these conditions.

Alternatively, the solid particles can be made of a lipid material, wherein the lipid material preferably is a wax. A wax is a non-glyceride lipid substance having the following characteristic properties: plastic (malleable) at normal ambient temperatures; a melting point above approximately 45° C. (which differentiates waxes from fats and oils); a relatively low viscosity when melted (unlike many plastics); insoluble in water but soluble in some organic solvents; hydrophobic. Preferred waxes are one or more waxes chosen from carnauba wax, shellac wax or beeswax. The particles may have any shape, like spherical or elongated or rod-like or platelet-like.

Waxes may be natural or artificial, but natural waxes, are preferred. Beeswax, carnauba (a vegetable wax) and paraffin (a mineral wax) are commonly encountered waxes which occur naturally. Some artificial materials that exhibit similar properties are also described as wax or waxy. Chemically speaking, a wax may be an ester of ethylene glycol (ethane-1,2-diol) and two fatty acids, as opposed to a fats which are esters of glycerine (propane 1,2,3-triol) and three fatty acids. It may also be a combination of other fatty alcohols with fatty acids.

In another preferred embodiment the solid particles can be made of a lipid material, wherein the lipid material comprises plant sterols or fatty acids/fatty acid esters. Plant sterols (also called phytosterols) are a group of steroid alcohols, phytochemicals naturally occurring in plants. At room temperature they are white powders with mild, characteristic odor, insoluble in water and soluble in alcohols. Plant sterols can be transformed into microparticles by inducing the precipitation of a plant sterol solution containing via solvent change during stirring. Herein, the particles can be with various shapes such as spherical, rod-like shape and platelet shape.

Preferably the aqueous foam composition further comprises a mixture of more than two types of aforementioned particles, thus the solid particles may comprise ethylcellulose and/or a lipid material. For example, the foam according to the second aspect of the invention could be stabilised by a mixture of ethylcellulose particles and shellac wax particles.

Preferably the aqueous foam composition comprises particles of a wax, wherein the particles have a volume weighted mean diameter between 30 nanometer and 10 micrometer. Preferably the particles have a volume weighted mean diameter between 30 nanometer and 2 micrometer. More preferably the particles have a volume weighted mean diameter between 30 nanometer and 1 micrometer, even more preferred between 30 nanometer and 500 nanometer. Preferred waxes are one or more waxes chosen from carnauba wax, shellac wax or beeswax. Preferably the wax is a food-grade waxy material. The particles may have any shape, like spherical or elongated or rod-like or platelet-like.

The preferred aqueous foam composition can be used as an aerated food product, wherein the food product may comprise ingredients commonly present in the food product.

Preferably the aqueous foam composition according to the invention is used to make an aerated food composition comprising the foam composition according to the invention, preferably having an overrun of at least 1%. More preferred, such food composition has an overrun of at least 5%, even more preferred at least 10%, most preferred at least 20%. Preferably the food product has an overrun of at most 150%, more preferably at most 120%, most preferably at most 100%.

Advantageously the food products comprising the foams according to the invention remain stable for at least 30 minutes, more preferred at least an hour, more preferred at least a day, even more preferred at least a week, and more preferred at least a month, and most preferred several months. With stable is meant that the foam is stable, which means that gas bubbles in the foam do not coalescence to become larger gas bubbles, or only show very limited coalescence and/or coarsening.

Suitable aerated food products are for example dressings like mayonnaise. Such dressings may have a total oil content ranging from 5% to 70% or 80% by weight. All such products are within the scope of the present invention.

The foams can also be used in food products to provide solid or semi-solid (e.g. spreadable) food products having a lower calorie content, while not being visible in the food product.

Further examples of preferred food products are cereal bars, chocolate bars, cookies and biscuits, confectionery products, condiments, confectionary, beverages, desserts, snacks, spreads like margarine or low fat margarines or dairy spreads, ice cream, sorbets, dressings, mayonnaise, sauces, bakery products like bread, shortenings, cheese (soft cheese, hard cheese), soups, dairy drinks, milk shakes, fruit drinks or juices, vegetable drinks or juices, e.g. smoothies, combinations of dairy, and/or fruit, and/or vegetable drinks (e.g. smoothies), cocoa drinks, and especially dairy mini-drinks.

Other preferred food compositions are frozen foods like ice cream, or frozen desserts.

Also soups (both in dry form (which have to be reconstituted with water), as well as liquid soups) are within the scope of the present invention. By incorporation of the foam into such food products, a creamy soup can be obtained, which does not have the calories associated normally with creamy soups (to which generally cream is added).

In case the food product is a beverage, more specifically a fruit drink, or combination of fruit and dairy drink, it preferably comprises at least 10% by weight of the composition of a fruit component, wherein the fruit component is selected from fruit juice, fruit concentrate, fruit juice concentrate, fruit puree, fruit pulp, comminuted fruit, fruit puree concentrate, and combinations thereof. Examples of such fruit components are orange juice, apple juice, grape juice, peach pulp, banana pulp, apricot pulp, concentrated orange juice, mango pulp, concentrated peach juice, raspberry puree, strawberry puree, apple pulp, raspberry pulp, concentrated grape juice, concentrated aronia juice, concentrated elderberry juice. Preferably such a beverage comprises at least 30% by weight of the beverage of said fruit component, more preferred at least 40% by weight of the beverage of said fruit component. These amounts are calculated as if undiluted, non-concentrated fruit juices and purees and the like are used. Thus, if 0.5% by weight of a 6-fold fruit concentrate is used, the actual amount of fruit component incorporated is 3% by weight of the beverage. Any commonly available fruit component might be used in the beverages according to the invention, and may be selected from one or more of the following fruit sources: citrus fruit (e.g. orange, tangerine, lemon or grapefruit); tropical fruit (e.g. banana, peach, mango, apricot or passion fruit); red fruit (e.g. strawberry, cherry, raspberry or blackberry), or any combination thereof.

In a further preferred embodiment the food product is a spread such as water-in-oil emulsions, for example a margarine or low fat margarine type food product. A spread may also be an oil-in-water emulsion, like dairy spreads or fresh soft cheeses. Suitably the total triglyceride level of such a spread may range from about 10% by weight to 85% by weight of the composition, more preferred from 20% to 70% by weight, most preferred from 30% to 60% by weight of the composition.

Especially preferred aerated food products according to the present invention are dairy drinks, which may for instance be used as a meal replacer.

The food product may be dried and contain less than 40% water by weight of the composition, preferably less than 25%, more preferably from 1 to 15%. Alternatively, the food may be substantially aqueous and contain at least 40% water by weight of the composition, preferably at least 50%, more preferably from 65 to 99.9%.

The food preferably comprises nutrients including one or more of the following: carbohydrate (including sugars and/or starches), protein, fat, vitamins, minerals, phytonutrients (including terpenes, phenolic compounds, organosulfides or a mixture thereof) or mixtures thereof. The food may be low calorie (e.g. have an energy content of less than 100 kCal per 100 g of the composition) or may have a high calorie content (e.g. have an energy content of more than 100 kCal per 100 g of the composition, preferably between 150 and 1000 kCal). The food may also contain salt, flavours, colours, preservatives, antioxidants, non-nutritive sweetener or a mixture thereof.

The preferred food products according to the invention are preferably prepared made by a method which involves aeration of an aqueous composition comprising a surface active material. The aggregated protein particles according to the first aspect of the invention can be added to the foam composition prior to aeration (thus as being part of an aqeuous premix) or can be mixed into the foam composition after aeration.

The surface active material in the food product that comprises a foam may be any surface active compound commonly used in foams, like for example a surfactant, or an emulsifier. The surface active material may also be a protein. Preferably the surface active material comprises water-insoluble solid particles, wherein the particles have a volume weighted mean diameter between 30 nanometer and 10 micrometer. The preferred aspect of these solid particles as described for the foams are applicable to the food product as well, mutatis mutandis. These particles serve to stabilise the air bubbles in the foam, by being present on the interface of the gas bubbles and the water.

In a third aspect the present invention provides the use of an aggregated protein particle according to the second aspect of the invention in an aerated food product. Preferably the invention provides the use of an aggregated protein particle according to the invention in an aerated food product having an overrun of at least 1%. The advantage of these aggregated protein particles is that they provide the nutritional value and texture usually connected to these proteins, without disturbing the stability of the aerated food composition, as these aggregated protein particles do not interfere with the surface active material present on the gas bubble interface. So these particles can be used in foams and aerated products.

The various features and embodiments of the present invention, referred to in individual sections above apply, as appropriate, to other sections, mutatis mutandis. Preferred features of the first, second, or third aspect of the invention, are also applicable to the other aspects of the invention, as applicable, mutatis mutandis. Consequently features specified in one section may be combined with features specified in other sections, as appropriate. All publications mentioned in the above specification are herein incorporated by reference. Various modifications and variations of the described methods and products of the invention will be apparent to those skilled in the art without departing from the scope of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in the relevant fields are intended to be within the scope of the claims.

EXAMPLES

The following non-limiting examples illustrate the present invention.

Methods

Surface tension is measured using a Kruss K11 tensiometer, with the Wilhelmy plate method. All measurements are done at a protein concentration of 1% by weight, at 25° C.

Particle sizing/electrophoresis: Dynamic light scattering measurements were carried out using a Zetasizer Nano ZS instrument (Malvern Instruments, Malvern, UK) to determine average particle diameters. Samples were measured without any dilution at 25° C. The viscosity of water was assumed in all cases and a refractive index of 1.59 was used in the analysis.

The results from the measurements are the z-average particle size and the standard deviation of the z-average particle size (which relates to the peak width of a distribution curve of the particle size). For monodisperse systems with a narrow distribution, the difference between the z-average particle diameter and volume weighted mean diameter ($d_{4,3}$) is smaller than 10%.

Example 1

Preparation of Aggregated Whey Protein Particles

Figure 1:
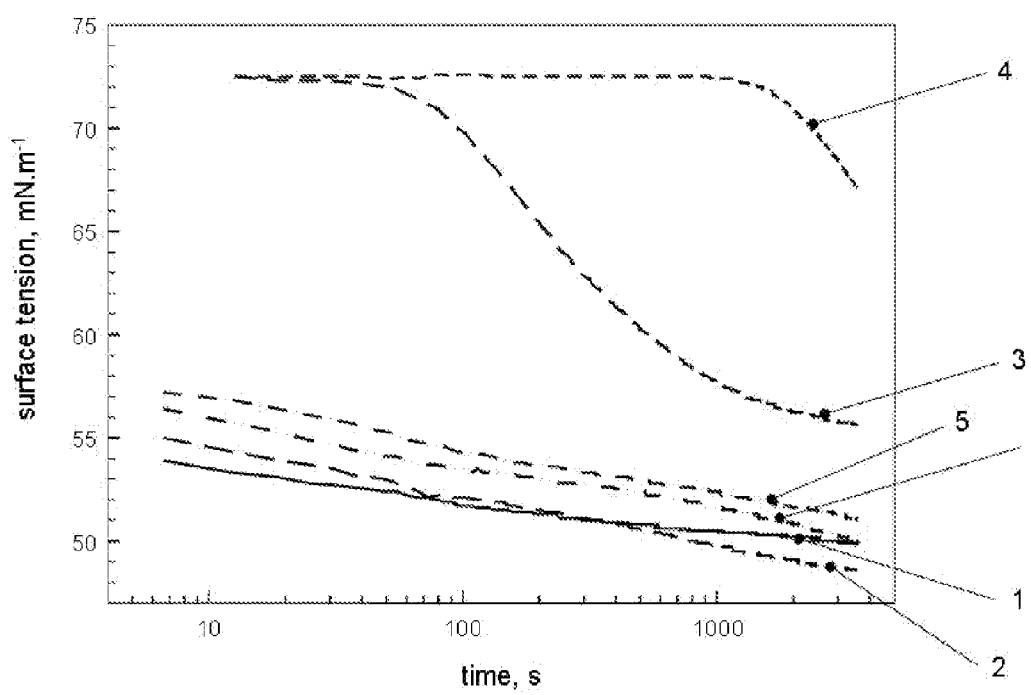
FIG. 1: Comparison between the surface tension of various whey protein solutions which have been treated in different manners; all at a concentration of 1% by weight at 25° C.
 1: WPC 80 not heated
 2: WPC 80, 90 minutes heated at 80° C. (not washed)
 3: WPC 80, 90 minutes heated at 80° C., 5× washed
 4: WPC 80, 90 minutes heated at 80° C., 10× washed
 5: Simplesse 100 ex CP Kelco (commercially available microparticulated whey protein concentrate)
 6: Simplesse 500 ex CP Kelco (commercially available microparticulated whey protein concentrate)

The surface tension of various whey protein solutions or dispersions was determined, which have been treated in different manners; all at a concentration of 1% by weight at 25° C. FIG. 1 gives the results of the measurements.

Whey powder concentrate (WPC 80 ex DMV International) was dissolved in water at a concentration of 10% by weight. The solution was introduced into a jacketed double walled glass vessel which was kept at a temperature of 80° C., and set to stir at ~700 rpm on a magnetic stirrer for 60 min. Subsequently the solution/dispersion was quench cooled in cold water.

Part of the solution was diluted three-fold with water and divided over centrifuge tubes and centrifuged for 30 minutes at 10,000 g. The supernatant was removed, and again the agglomerated whey protein was dispersed in water at a three-fold dilution, and subsequently centrifuged for 30 minutes at 10,000 g. This was repeated 4 or 9 times, such that the agglomerated protein had been washed in total 5 or 10 times, as applicable. The z-average hydrodynamic diameter of the obtained aggregated protein particles was about 3.1 micrometer. These particles were further reduced in size by mixing combined with ultrasound, to a z-average hydrodynamic diameter of about 296 nanometer.

In FIG. 1 it is shown that Simplesse 100 (curve 5) and Simplesse 500 (curve 6) ex CP Kelco, which are commercially available microparticulated whey protein concentrates, have a relatively low surface tension. This means that still surface active material is present, and that Simplesse 100 and 500 contribute to foaming. Also a solution of WPC 80 as received (curve 1) and WPC 80 which has been heated at 80° C. for 90 minutes (curve 2) (without subsequent washing) have a relatively low surface tension. The WPC 80 solutions which have been heated at 80° C. during 60 minutes at a concentration of 10% by weight and subsequently washed 5 times (curve 3) or 10 times (curve 4) have a much higher surface tension. The particles were measured before being reduced in size by ultrasound. The surface tension of the dispersion of the aggregated protein according to the invention is about at the value of that of pure water, which means that the material has strongly reduced surface activity.

The material that has been washed 5 times shows some decrease of surface tension after about 100 seconds, due to release of some minor surface active compounds from the agglomerated protein during the measurement. Similarly, the material that has been washed 10 times shows some decrease of surface tension after about 1,000 seconds.

This shows that the agglomerated and washed whey protein has a higher surface tension than not-washed WPC 80, even equal to the surface tension of pure water. This means that the agglomerated protein has strongly reduced surface activity, and does not contribute to foaming. Also applying more washing steps improves the removal of surface active material.

Example 2

Preparation of Aggregated Chicken Egg White Protein Particles

The following procedure was followed to prepare chicken egg white protein having reduced surface activity:
a. introduce liquid egg white protein (Ovod'or ex Van Tol Convenience Food, 's-Hertogenbosch, Netherlands) into a jacketed double walled glass vessel kept at a temperature slightly above 80° C. and set to stir at 700 rpm on a magnetic stirrer for 100 minutes;
two separate samples were made, the first at a protein concentration of 10.5% by weight (Ovod'or as such), and a second at a protein concentration of 5.3% by weight (Ovod'or diluted with water);
b. quench cool the solution in cold water;
c. dilute the heated solution at least 3 fold with pure water and divide over centrifuge tubes and centrifuge for 30 minutes at 10,000 to 15,000 g;
d. remove the supernatant;
e. 1 sample was taken from the initial protein concentration of 5.3% and 1 sample was taken from the initial protein concentration of 10.5%, meaning without washing the residue (to determine the surface tension of these samples in water);
f. water was added to the remaining samples to replace the removed supernatant, water was mixed with the residue to wash the residue, followed by centrifuging again;
g. step f was repeated 2 times.

Figure 2:
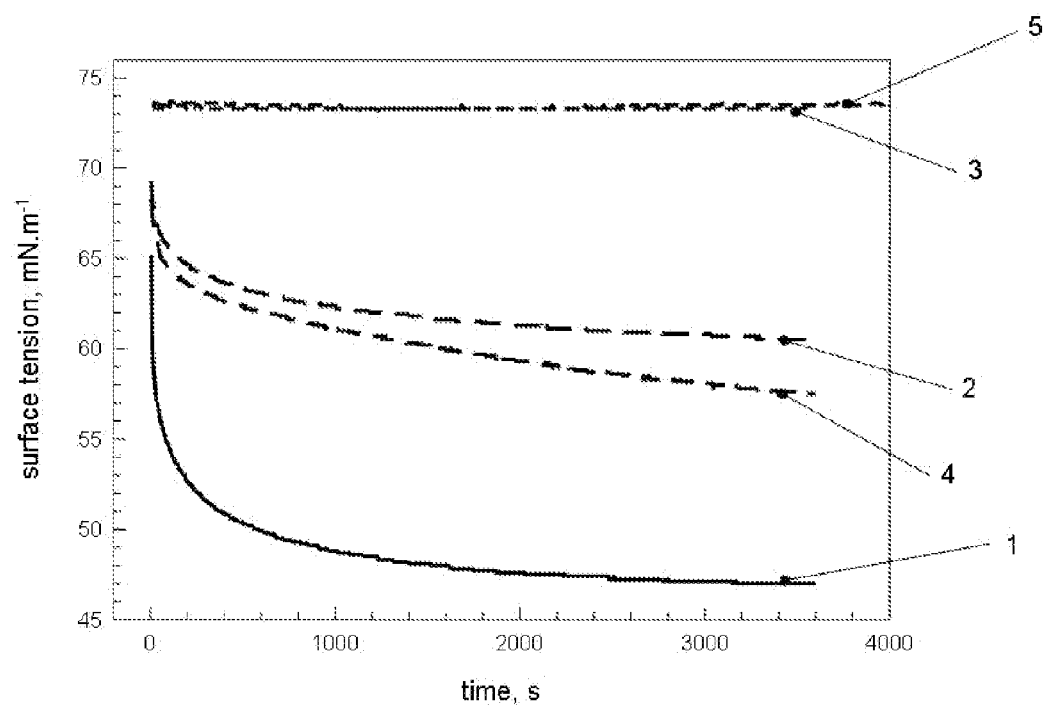
FIG. 2: Comparison between the surface tension of various chicken egg white solutions which have been treated in different manners; all at a concentration of 1% by weight at 25° C.
 1: native
 2: heated (from 10.5% initial concentration), not washed
 3: heated (from 10.5% initial concentration), 3× washed
 4: heated (from 5.3% initial concentration), not washed
 5: heated (from 5.3% initial concentration), 3× washed

Four different samples were obtained:
heated chicken egg white protein, initial concentration 10.5%, not washed
heated chicken egg white protein, initial concentration 10.5%, 3× washed
heated chicken egg white protein, initial concentration 5.3%, not washed
heated chicken egg white protein, initial concentration 5.3%, 3× washed The surface tension of these chicken egg white protein solutions or dispersions was determined, as well as the unheated chicken egg white protein; all measurements were done at a protein concentration in water of 1% by weight at 25° C. FIG. 2 gives the results of the measurements.

Example 3

Preparation of Ethylcellulose Dispersion

Ethylcellulose (type N 100) was purchased from Hercules (Schnelldorf, Germany). Ethoxyl content was 48.0-49.5%, and degree of substitution was 2.46-2.57. Viscosity was 80-105 mPa.s (at 5% and 25° C. in 80/20 toluene/ethanol). Acetone, analytical grade, was obtained from Sigma Chemicals (Schnelldorf, Germany) and used without further purification. Deionised water was obtained from a Millipore filter system.

A dispersion of ethylcellulose particles in water was prepared by the following method:
a. 1% by weight of ethylcellulose powder was dissolved in 100 ml acetone (purity >98%,) at 35° C. in a 500 mL beaker until completely dissolved.
b. An equal volume of distilled water was quickly added to the ethylcellulose solution under strong stirring to precipitate the ethylcellulose into particles.
c. The solution was left to stir for another 10 minutes after which the acetone and some of the water is evaporated under low pressure in a rotary evaporator, until a final concentration of ethylcellulose in water of 2% was obtained.
d. Tartaric acid was added to reach a pH of 3.

The obtained ethylcellulose particles had a z-average diameter of about 130 nanometer. For monodisperse systems with a narrow distribution, which is the case for these particles, the difference between the z-average particle diameter and volume weighted mean diameter ($d_{4,3}$) is smaller than 10%.

Example 4

Frozen Aerated Products Containing Aggregated Whey Protein Particles

In this example two aerated frozen products were produced, where the surface active component principally used to stabilise the foam phase is ethyl cellulose particles, produced as described in example 3. The stability of the product is compared when produced with standard whey protein (product 1) and also when produced with aggregated whey protein particles (product 2) as produced in example 1.

The general procedure for preparation of a frozen aerated product in a stirred pot apparatus is the following:
a. add 80 mL premix, the formulation as stated for product 1 or product 2 in the table;
b. set the cooling bath to a temperature of −18° C.;
c. chill the stirred pot by circulating the cooling liquid for 10 seconds;
d. stir 1 minute at 100 rpm;
e. stir 1 minute at 1000 rpm;
f. start cooling the vessel by circulating the cooling liquid;
g. stir 3 minutes at 1000 rpm;
h. stir at 300 rpm until the mix has obtained a temperature of −5° C., or a torque of 0.7-0.8 N·m has been reached.
i. the aerated frozen product is then dosed into ca. 30mL sample containers, overrun determined, and then cooled further on solid carbon dioxide before transferring to a −80° C. before further analysis.

The stirred pot apparatus consisted of a cylindrical, vertically mounted, jacketed stainless steal vessel with internal proportions of height 105 mm and diameter 72 mm, which contained an agitator. The agitator consisted of a rectangular impeller (72 mm×41.5 mm) which scrapes the edge of the vessel as it rotates and two semi-circular blades (60 mm diameter) positioned at a 45° angle to the impeller.

Fresh samples of the ice cream were stored at −80° C., at which temperature the texture of the ice cream is stable, air bubbles do not change their average diameter. Bubble stability of 'Temperature abused' samples were determined by storing the ice cream at −10° C. for 1 week. Subsequently the ice cream was brought to −80° C. again, in order to capture the structure. The average air bubble size can be determined by freeze fracturing samples of the ice cream at −80° C., and observing the ice cream fractured surface by scanning electron microscopy, both before and after storage at −10° C. for 1 week.

Two samples of frozen aerated product were produced, as indicated in the following table.

TABLE

Compositions and process parameters of frozen aerated products

| ingredient | product 1 [wt %] | product 2 * [wt %] |
|---|---|---|
| 2% ethylcellulose dispersion (from example 3) | 50 | 33.2 |
| sucrose | 25 | 16.6 |
| WPC 80 ex DMV international | 5 | 0 |
| aggregated whey protein particles, heat treated WPC 80 slurrry, containing 10% by weight whey protein (prepared as in example 1, 3 times washed) | 0 | 50 |
| xanthan gum (Keltrol RD ex CP Kelco) | 0.2 | 0.13 |
| water | 24.8 | 0 |
| Results | | |
| total time | 9.20' min | 9.00' min |
| torque [N · m] | 0.6 | 0.5 |
| temperature [° C.] | −4.7 | −4.8 |
| overrun | 83% | 38.4% |

* Product 2 was produced by mixing sugar and xanthan gum into the ethylcellulose dispersion, and this mixture was mixed with heated WPC 80 dispersion.

Product 1 contains more sugar than product 2. This does not lead to a softer product, although sucrose may act as a freeze-point depressor. This is demonstrated by the torque that is measured during the cooling of both product mixtures: the torque of product 1 is higher than (or nearly equal to) that of product 2, meaning that product 1 is not softer than product 2. The softness may influence the stability of an aerated food product; in the present case the softness of both products is equal or nearly equal, hence this does not influence the stability.

The overrun obtained for product 2 is lower than that of product 1, which may be caused by a slightly lower concentration of ethylcellulose dispersion in product 2, and because the dispersion of deactivated whey protein has a higher viscosity than not-heat treated whey. When the aeration time is equal or nearly equal, this results in a lower overrrun.

Figure 3:
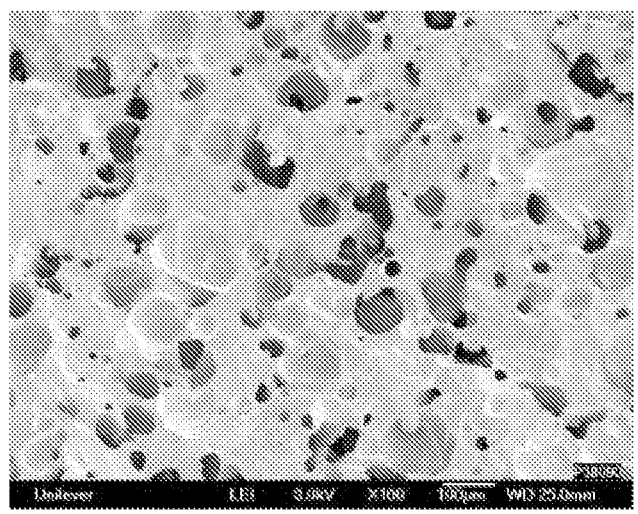
FIG. 3: Scanning electron microscopy images of product 1 from example 4, magnification 100× (bar size 100 micrometer); grey and black spots and shapes are the irregularly shaped holes holding the air bubbles.
 top image: fresh, after production
 bottom image: after 1 week storage at −10° C.
Figure 3:
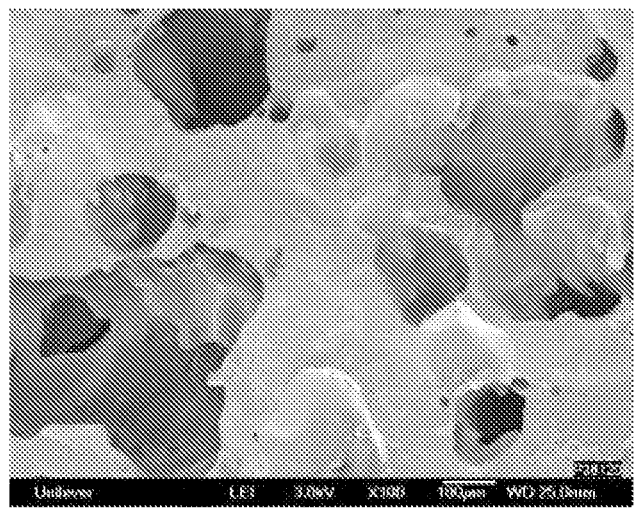

Product 1 (FIG. 3): frozen aerated product with ethylcellulose particles, xanthan gum, sugar, and surface active whey protein (WPC 80 ex DMV International). This serves as comparative example. At −80° C. (fresh), a homogeneous dispersion of air bubbles could be observed, having an average diameter of about 100 micrometer (FIG. 3 top). After keeping at −10° C. during 1 week, the product showed strong coarsening of the microstructure, accompanied by coalescence and channnel formation (FIG. 3 bottom). Air bubbles have grown much larger than 100 micrometer and the growth is accompanied by coalescence and channel formation. This shows the decay in stability of the ice cream structure due to competitive adsorption of whey protein particles at the bubble interface, and therewith the stabilising influence of the ethylcellulose particles is decreased.

Figure 4:
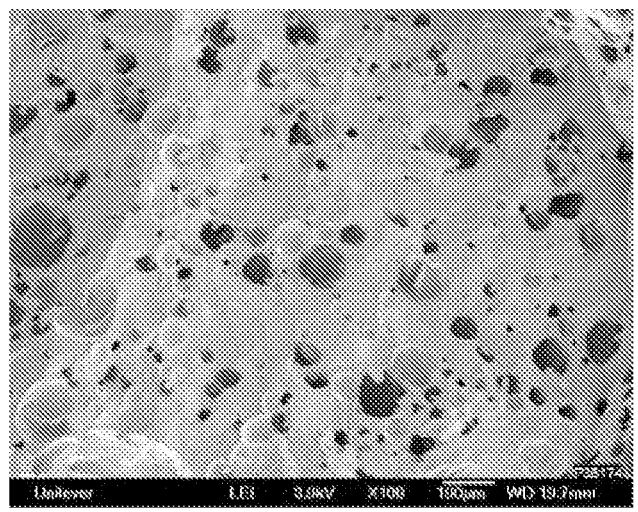
FIG. 4: Scanning electron microscopy images of product 2 from example 4, magnification 100× (bar size 100 micrometer); grey and black spots and shapes are the irregularly shaped holes holding the air bubbles.
 top image: fresh, after production
 bottom image: after 1 week storage at −10° C.
Figure 4:
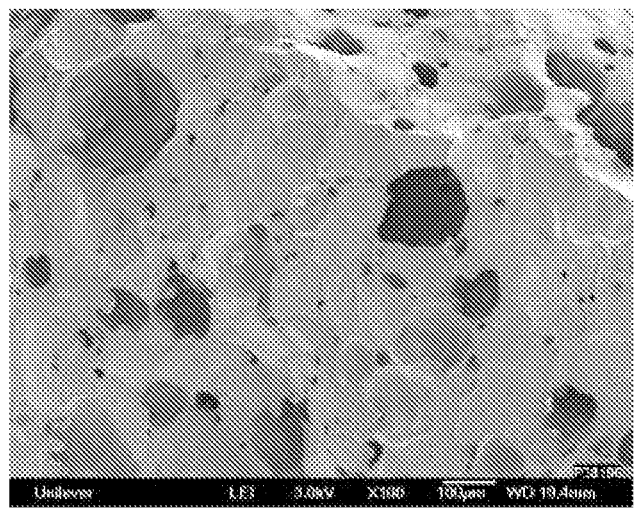

Product 2 (FIG. 4): frozen aerated product with ethylcellulose particles, xanthan gum, sugar, and reduced surface active whey protein (heat treated WPC 80 from example 1). At −80° C. (fresh), a homogeneous dispersion of air bubbles could be observed with bubble sizes roughly ranging between 10 micrometer and 100 micrometer (FIG. 4 top), although the overrun is lower than for product 1. After keeping at −10° C. during 1 week (FIG. 4 bottom), the product showed a population of larger bubbles (i.e. about 100 micrometer), but also the population of remaining smaller bubbles (i.e. less than 10 micrometer, little black spots in FIG. 4 bottom) was apparent. This shows that whey protein having reduced surface activity does not interfere with the ethylcellulose that stabilises the air bubbles. Many small bubbles remain present in the product, opposite to product 1. The coarsening that is observed is much lower than product 1.

This experiment shows that an aerated food product in which the bubbles are stabilised by solid colloidal particles (ethylcellulose in this case) also can contain a considerable amount of protein, when the protein has been treated to make it non-surface active. Still the aerated food product is much more stable than a similar product that contains 'normal' protein (i.e. not non-surface active).

The invention claimed is:

1. A method for preparation of aggregated protein particles, comprising the steps:
   a) dissolving or dispersing a protein in an aqueous solution at a concentration between 4% and 15% by weight;
   b) aggregating the protein into water insoluble particles having a volume weighted mean diameter between 500 nanometer and 20 micrometer;
   c) separating aggregated protein particles from non-aggregated protein by washing with water, and wherein an aqueous dispersion of the insoluble aggregated protein particles at a concentration of 1% by weight at 25° C. has a surface tension of at least 60 mN·m$^{-1}$; and
   at most 0.1 wt % of the insoluble aggregated protein particles dissolves in water when the compound is mixed with water at room temperature, atmospheric pressure and neutral pH.

2. A method for preparation of aggregated protein particles according to claim 1 wherein the protein is selected from the group consisting of dairy whey protein and chicken egg white protein.

3. A method for preparation of aggregated protein particles according to claim 1, wherein the volume weighted mean diameter is between 500 nanometer and 15 micrometer.

4. A method for preparation of aggregated protein particles according to claim 1, wherein in step b) at least 50% by weight of the protein present in step a) is aggregated.

5. A method for preparation of aggregated protein particles according to claim 1 wherein step b) is performed by heating of a protein solution prepared in step (a) under shear at a temperature between 75 and 99° C., during a period of between 10 and 300 minutes.

6. A method for preparation of aggregated protein particles according to claim 1, wherein in step (c)-the washing with water is done by performing at least 3 washing steps.

7. A method for preparation of aggregated protein particles according to claim 1, wherein subsequently the insoluble aggregated protein particles are dried.

8. An insoluble aggregated protein particle comprising:
   an insoluble aggregated protein particle wherein an aqueous dispersion of the aggregated protein particle at a concentration of 1% by weight at 25° C. has a surface tension of at least 60 mN·m$^{-1}$; and
   at most 0.1 wt % of the insoluble aggregated protein particles dissolves in water when the compound is mixed with water at room temperature, atmospheric pressure and neutral pH.

9. An aqueous foam composition comprising:
   a surface active material; and
   an insoluble aggregated protein particle wherein an aqueous dispersion of the aggregated protein particle at a concentration of 1% by weight at 25° C. has a surface tension of at least 60 mN·m$^{-1}$; and
   at most 0.1 wt % of the insoluble aggregated protein particles dissolves in water when the compound is mixed with water at room temperature, atmospheric pressure and neutral pH.

10. An aqueous foam composition according to claim 9, wherein the surface active material comprises water-insoluble solid particles, wherein the particles have a volume weighted mean diameter between 30 nanometer and 10 micrometer.

11. An aerated food composition comprising:
    a surface active material comprising: water-insoluble solid particles, wherein the particles have a volume weighted mean diameter between 30 nanometer and 10 micrometer; and
    an insoluble aggregated protein particle wherein an aqueous dispersion of the aggregated protein particle at a concentration of 1% by weight at 25° C. has a surface tension of at least 60 mN·m$^{-1}$; and
    at most 0.1 wt % of the insoluble aggregated protein particles dissolves in water when the compound is mixed with water at room temperature, atmospheric pressure and neutral pH.

12. A method of using an aggregated protein particle, comprising:
    adding an insoluble aggregated protein particle to an aerated food product wherein an aqueous dispersion of the insoluble aggregated protein particle at a concentration of 1% by weight at 25° C. has a surface tension of at least 60 mN·m$^{-1}$; and
    at most 0.1 wt % of the insoluble aggregated protein particles dissolves in water when the compound is mixed with water at room temperature, atmospheric pressure and neutral pH.

* * * * *